Oct. 19, 1937.   C. P. DEIBEL   2,096,628
DRY CELL AND TERMINAL CONNECTION THEREFOR
Filed April 10, 1936
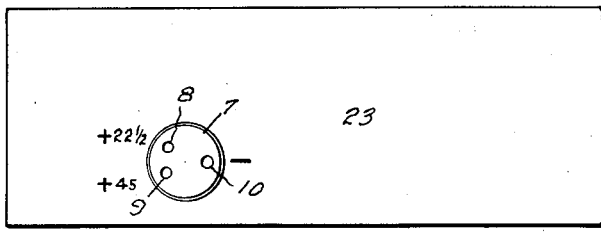
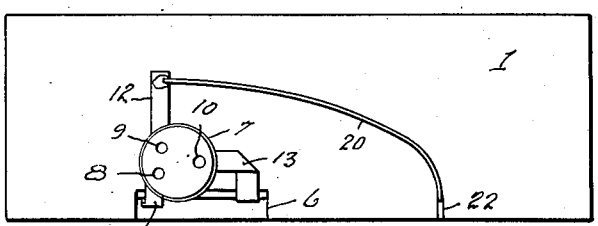
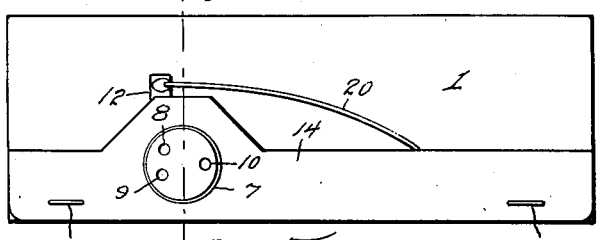
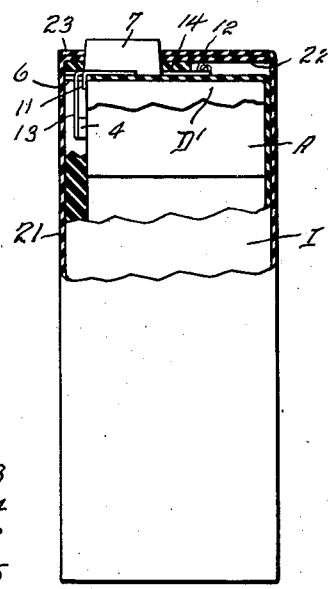
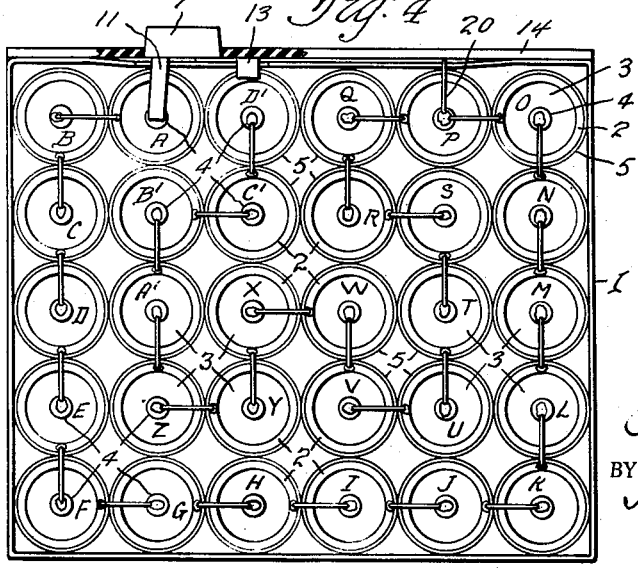
INVENTOR.
Cyril P. Deibel
BY
Hull, Brock & West
ATTORNEY.

Patented Oct. 19, 1937

2,096,628

UNITED STATES PATENT OFFICE 2,096,628

DRY CELL AND TERMINAL CONNECTION THEREFOR

Cyril P. Deibel, Lakewood, Ohio

Application April 10, 1936, Serial No. 73,744

2 Claims. (Cl. 136—109)

This invention relates generally to dry cell battery units and more particularly to what is known in the art as a B-battery and to a method of assembling the same.

In my Patent No. 1,809,924 there is disclosed a B-battery unit and method of assembling the same which has three terminal connections which are supported upon a reinforcing member which is attached to one side of the unit. In more recent years there has come into general use for batteries of this character a universal socket or plug-in connection by means of which the entire unit may be connected in one operation.

One of the objects of this invention is to provide a dry cell battery unit of the character described which has a universal plug-in socket or terminal connection which is positioned upon a reinforcing member and rigidly and permanently connected to the cells in such a manner that it cannot be easily disconnected or dislodged.

Another object of the invention is to provide a dry cell battery unit of the character described in which the universal plug-in terminal is carried by a reinforcing member disposed at one side of the container and which is positioned so that the number of connections is reduced to a minimum and the chance of error or short circuits is also greatly reduced.

Another object of the invention is to provide a method of assembling a battery unit of the character described which will facilitate and speed up production of the units on a commercial scale.

Further and more limited objects of the invention will appear as the description proceeds and by reference to the accompanying drawing in which Fig. 1 is a top plan view of a dry cell battery unit constructed in accordance with my invention; Fig. 2 is a top plan view of the inner carton, which contains the cells, before the reinforcing member is applied; Fig. 3 is a view similar to Fig. 2 with the reinforcing member in place; Fig. 4 is a view in elevation of the inner carton with the cells therein before it is inserted into the outer carton; and Fig. 5 is a view partially in section and partially in elevation on substantially the line 5—5 of Fig. 3.

Referring now to the drawing, the battery unit consists essentially of an inner carton or container 1 which is preferably made of paper and is rectangular in shape and in which are arranged a plurality of dry cells each of which consists of a zinc can 2 in which is disposed a mass of mix 3 and a carbon electrode 4 and which is enclosed within a suitable insulating wrapper 5. One side of the inner container 1 is provided with a cutout portion 6 adapted to receive therein the universal plug-in socket or terminal connection 7 which has therein three holes or slots indicated by the reference characters 8, 9 and 10. Leading from the universal terminal are a plurality of metal tabs 11, 12 and 13 which are flat and somewhat elongated. Fitting over the universal plug-in socket is a reinforcing strip 14 which is formed of cardboard, strawboard or the like and which is fastened to the side wall of the container 1 by suitable clips 15 and 16. This reinforcing member has an opening therein positioned unequal distances from the opposite ends thereof and through which the plug-in terminal projects and serves to position and reinforce the same.

Universal plug-in socket connections of this character are well known to those skilled in the art and a detailed description of the same does not appear to be necessary. However, it might be explained that the socket 7 has a plurality of circular openings or slots 8, 9 and 10 therein which are adapted to receive therein the complementary half of the socket which has prongs thereon which engage in the openings. The opening 10 is somewhat larger than the openings 8 and 9 and the prongs have the same relative sizes so that the plug portion of the socket can be connected thereto only in the correct position. The several cells which make up the battery unit are connected in series in the manner shown in Fig. 4. For convenience of description, the cells are indicated by the reference characters A, B, C, D, E, F, G, H, I, J, K, L, M, N, O, P, Q, R, S, T, U, V, W, X, Y, Z, A', B', C', D' and are connected in series with each other in the order mentioned starting with the carbon electrode of cell A. The tab 11 of the plug-in socket is rigidly connected to the carbon electrode of cell A. The tab 13 is rigidly connected to the zinc or negative electrode of the cell D' so that full voltage of battery unit is obtained with these connections. The tab 12 is connected with the carbon electrode of cell P, which cell is the fifteenth cell of the series. The tabs have sufficient rigidity to rigidly and permanently secure the terminal in place and also serve as a means for tapping off different voltages. Due to the particular manner in which the cells are connected, it will be seen that the cells A and D' are disposed immediately adjacent each other and also immediately adjacent the terminal socket connection and that the cell P is located on the side of the carton immediately adjacent the socket so that a minimum number of connections are required.

One advantage of my construction is that I am able to solder substantially all of the connections in a single operation with an automatic soldering machine and am also able to pour the seal in all of the cells at once, when and if a seal of such character is required.

After all of the connections are made, as hereinbefore described, the inner container 1 is inserted within an outer carton 21 which has an inner flap 22 having a circular opening therein through which the terminal socket connection 7 projects and an outer flap 23 which likewise has a circular opening therein adapted to receive the plug-in socket connection therethrough. These flaps are preferably permanently sealed by means of a suitable adhesive. The openings in the cover flaps of the outer carton are positioned unequal distances from the opposite ends thereof so that the inner carton can be inserted in the outer carton in only the correct position. This is quite important as the outer flap bears suitable indicia thereon indicating the several voltages obtained. The universal plug-in socket is rigidly and permanently secured to the cells by means of the connectors and is reinforced by the reinforcing member 14 so that it is not likely to become dislodged or disconnected.

In assembling the unit I first insert the cells into the inner carton which have the wires soldered to the zinc cans. The universal plug-in connection is then positioned within the cut-out portion of one side wall of the carton and the reinforcing member 14 placed thereover and clipped or otherwise secured to the side wall of the container. The side wall of the container also has a slot 22a therein which receives therethrough the wire 20. The terminal connection 13 may then be soldered to the zinc can of cell D' and the terminal connection 11 soldered to the carbon electrode of the cell A. When the cells are placed in the carton, there is secured to each of the zinc cans a short length of wire. These tabs are bent over and soldered to the electrodes of the adjacent cells in the order described. Due to my method of assembly, I am able to solder these connections simultaneously with an automatic soldering machine. The wire 20 which has one end connected with the terminal 12 may then be soldered to the carbon electrode of the cell P and the wire of cell D' is soldered to terminal 13 which completes the electrical connections for the unit. If it is desired to seal the inner carton, the seal may be poured over all of the cells at one operation. However, this seal may be omitted if desired. The inner carton, thus assembled, is then inserted into the outer carton and the flaps 22 and 23 closed and sealed. The unit is then complete except for some testing operations for the purpose of ascertaining whether all of the connections have been properly made.

The reinforcing strip or tab 14, if desired, may be formed integral with the side wall of the box and folded over to the position shown instead of being clipped thereto by the clips 15 and 16. The flaps 22 and 23 may also be omitted if desired, and the outer carton closed by means of the conventional battery sealing compound and the outer carton may be of such height that the terminal connection 7 will be disposed flush with the top of the carton.

It will now be clear that I have provided a dry cell battery unit and method of assembling the same which will accomplish the objects of the invention as hereinbefore stated. It is of course to be understood that various changes may be made in the details of construction, as well as in the method of assembly, without departing from the spirit of my invention; and the embodiment of the invention herein disclosed is to be considered merely as illustrative and not in a limiting sense as the invention is limited only in accordance with the scope of the appended claims.

Having thus described my invention, what I claim is:

1. A dry cell battery unit comprising a container in which are arranged thirty dry cells connected in series, a universal plug-in socket terminal disposed over one wall of said container and having a plurality of tabs thereon, means rigidly connecting one of said tabs with the carbon electrode of cell No. 1 of the series, means rigidly connecting another of said tabs with the negative electrode of cell No. 30 of the series, means rigidly connecting another of said tabs with the carbon electrode of cell No. 15 of the series, cells No. 1 and No. 30 being disposed immediately adjacent said terminal and cell No. 15 being disposed adjacent the side of said container to which said terminal is applied, said tabs serving to provide different voltage taps and having sufficient rigidity to permanently secure said terminal in place.

2. A dry cell battery unit comprising a container in which are arranged a plurality of dry cells connected in series, a universal plug-in socket terminal disposed over one wall of said container and having a plurality of rigid tabs thereon, means permanently connecting one of said tabs with the carbon electrode of the first cell of the series, means connecting another of said tabs with the negative electrode of the last cell of the series, means connecting another of said tabs with the carbon electrode of an intermediate cell of a series, the first and last cells of the series being disposed immediately adjacent said terminal and said intermediate cell being disposed adjacent the side of said container to which said terminal is applied, said tabs serving to provide different voltage taps and having sufficient rigidity to permanently secure the terminal in place.

CYRIL P. DEIBEL.